(12) United States Patent
Demmig

(10) Patent No.: US 9,617,033 B2
(45) Date of Patent: *Apr. 11, 2017

(54) TWO-COMPONENT POLYURETHANE COMPOSITIONS THAT ARE ESPECIALLY SUITABLE FOR USE AS STRUCTURAL ADHESIVES

(71) Applicant: SIKA TECHNOLOGY AG, Baar (CH)

(72) Inventor: Martin Demmig, Hamburg (DE)

(73) Assignee: SIKA TECHNOLOGY AG, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/224,403

(22) Filed: Mar. 25, 2014

(65) Prior Publication Data

US 2014/0203024 A1    Jul. 24, 2014

Related U.S. Application Data

(63) Continuation of application No. 11/884,004, filed as application No. PCT/EP2006/050853 on Feb. 10, 2006, now Pat. No. 8,790,781.

(30) Foreign Application Priority Data

Feb. 11, 2005  (EP) .................................... 05101001

(51) Int. Cl.
| | | |
|---|---|---|
| *C09J 5/00* | (2006.01) | |
| *C08G 18/72* | (2006.01) | |
| *B65D 6/00* | (2006.01) | |
| *C08G 18/32* | (2006.01) | |
| *C09J 175/04* | (2006.01) | |

(52) U.S. Cl.
CPC .......... *B65D 11/00* (2013.01); *C08G 18/3215* (2013.01); *C08G 18/72* (2013.01); *C09J 5/00* (2013.01); *C09J 175/04* (2013.01); *Y10T 428/31551* (2015.04)

(58) Field of Classification Search
None
See application file for complete search history.

(56) References Cited

U.S. PATENT DOCUMENTS

| | | | |
|---|---|---|---|
| 3,252,944 A | 5/1966 | Curtis | |
| 3,647,616 A | 3/1972 | Zemlin | |
| 4,724,892 A | 2/1988 | Schneider et al. | |
| 5,059,670 A * | 10/1991 | Harris ................ | C08G 18/0842 428/209 |
| 2004/0072952 A1 | 4/2004 | Hung et al. | |

FOREIGN PATENT DOCUMENTS

| | | |
|---|---|---|
| EP | 0 454 446 A1 | 10/1991 |
| EP | 0 556 758 A2 | 8/1993 |
| EP | 1253 159 A1 | 10/2002 |

* cited by examiner

*Primary Examiner* — Jeffrey Washville
(74) *Attorney, Agent, or Firm* — Oliff PLC

(57) ABSTRACT

The invention relates to two-component polyurethane compositions that are especially suitable for use as structural adhesives. Said compositions are constituted of a polyol component K1 and a polyisocyanate component K2, the polyol component K1 comprising at least one alkoxylated aromatic diol A1 and at least one aliphatic triol A2 and the polyisocyanate component K2 comprising at least one polyisocyanate B1.

16 Claims, No Drawings

TWO-COMPONENT POLYURETHANE COMPOSITIONS THAT ARE ESPECIALLY SUITABLE FOR USE AS STRUCTURAL ADHESIVES

This is a continuation of application Ser. No. 11/884,004 filed on Oct. 7, 2008, which is a National Stage Application of PCT/EP2006/050853 filed Feb. 10, 2006, and claims the benefit of European Patent Application No. EP05101001.5 filed Feb. 11, 2005. The disclosures of the prior applications are hereby incorporated by reference herein in their entirety.

TECHNICAL FIELD

The invention relates to the field of two-component polyurethane compositions, more particularly of structural two-component polyurethane adhesives.

PRIOR ART

Two-component polyurethane adhesives based on polyols and polyisocyanates have already been known for a long time. Two-component polyurethane adhesives have the advantage that, after mixing, they cure rapidly and so are able to accommodate relatively high forces rapidly after just a short time. For use as structural adhesives, however, exacting requirements in respect of strengths and adhesive forces are imposed on such adhesives, since adhesives of this kind constitute elements of load-bearing structures. High strengths are typically achieved through high degrees of crosslinking. This is typically achieved through the use of relatively highly polyfunctional polyols or polyamines and relatively highly polyfunctional polyisocyanates.

Thus, for example, EP 1 253 159 A1 discloses in the examples a structural adhesive whose polyol component comprises a mixture of a tetrafunctional aliphatic polyol and a difunctional aliphatic polyol and whose isocyanate component is a prepolymer based on polypropylene glycol and 4,4'-diphenylmethane diisocyanate.

A high level of use of the highly polyfunctional reactants, however, has the effect of a massive decrease in the extension, with the result that stress peaks occur under load, and adhesives of this kind become brittle.

There is therefore a desire for rapid adhesives which exhibit high strengths and nevertheless a high elasticity.

DESCRIPTION OF THE INVENTION

It is an object of the present invention, therefore, to provide a two-component polyurethane composition, more particularly a structural two-component polyurethane adhesive, which features high strength with high extension. This is made possible through the two-component polyurethane composition of claim 1.

The addition of an alkoxylated aromatic diol to an aliphatic triol in the polyol component surprisingly increases the extension but without lowering the strength.

The improved extension leads to improved impact toughness of the cured material. In addition it has been found that the composition of the invention, as a result in particular of the use of an alkoxylated aromatic diol, has improved adhesion to metallic surfaces. Finally it has been observed that the compositions of the invention are distinguished by outstanding aging stability, more particularly with respect to moisture and temperature fluctuation.

EMBODIMENTS OF THE INVENTION

The present invention relates to a two-component polyurethane composition composed of a polyol component K1 and a polyisocyanate component K2. This polyol component K1 comprises at least one alkoxylated aromatic diol A1 and at least one aliphatic triol A2. The polyisocyanate component K2 comprises at least one polyisocyanate B1.

The prefix "poly" in designations such as "polyol", "polyisocyanate", "polyether" or "polyamine" indicates in the present document that the substance in question contains, formally, more than one of the functional groups occurring in its name, per molecule.

An "aromatic diol" here and below is a diol which contains at least one aromatic nucleus and two hydroxyl groups. In the diol there may also be two or more aromatic nuclei present. Preferably the hydroxyl groups are not phenolic groups, i.e., they are advantageously not located directly on the aromatic nucleus.

The aromatic nucleus may also be fused and/or heteroaromatic and/or a nucleus containing further substituents. In a heteroaromatic nucleus there are heteroatoms present which are part of the aromatic ring or ring system.

Examples of aromatic nuclei of this kind are substituted benzene, naphthalene, anthracene, phenanthrene, imidazole, pyridine, pyrrole, pyrimidine, pyrazine, quinoline and phenazine. Examples of diols having two or more aromatic nuclei are diols having the parent structure of a biphenyl, terphenyl, 2,2'-bipyridine, diphenylmethane, 1,1-diphenylethane or 2,2-diphenylpropane.

Aromatic diols which have shown themselves to be particularly suitable are those prepared from phenol and from formaldehyde, acetaldehyde or acetone or mixtures thereof, more particularly bisphenol A, bisphenol F or bisphenol A/F.

Preferably the alkoxylated aromatic diol A1 is an ethoxylated and/or propoxylated aromatic diol.

Alkoxylated diols of this kind preferably have the structure of the formula (I)

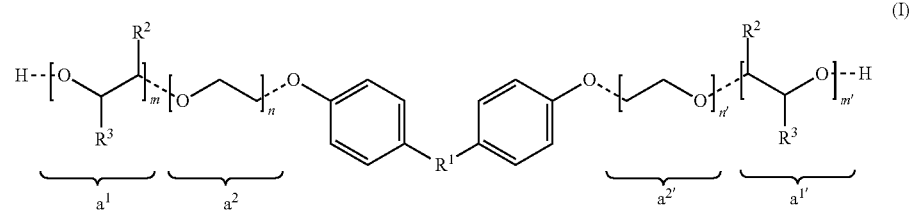

In this formula the substituent $R^1$ is a group $CH_2$, $CH(CH_3)$ or $C(CH_3)_2$.

The indices n, n', m and m' are values such that $n+n'+m+m'=1$ to 20, more particularly $n+n'+m+m'=1$ to 8.

Furthermore, the substituents $R^2$ and $R^3$ are each such that $R^2$=H and $R^3$=methyl or $R^2$=methyl and $R^3$=H.

The segments $a^1$ and $a^{1'}$ denote an oxypropylene unit (PO) and $a^2$ and $a^{2'}$ an oxyethylene unit (EO). The dashed lines in formula (I) represent the fact, schematically, that the sequence of the mutually attached alkylene glycol segments $a^1$, $a^{1'}$, $a^2$ and $a^{2'}$ is variable. For instance, a blockwise or alternating or random sequence of these oxyalkylene units is possible. Alkoxylated aromatic diols of this kind are prepared in a manner which is known to the skilled worker.

It is clear to the skilled worker, furthermore, that in the alkoxylation of a diol it is also entirely possible for molecules to be formed which have different degrees of alkoxylation in the two chains. It is also clear to the skilled worker, moreover, that in the case of alkoxylations there are always distributions of different molecules. This is reflected in the fact, inter alia, that the total degree of alkoxylation ("TAG"=n+n'+m+m') may also be odd-numbered or adopt a non-integral value.

Purely propoxylated aromatic diols of the formula (I) are preferred over purely ethoxylated or mixed EO/PO-alkoxylated aromatic diols of the formula (I), i.e., n is preferably =n'=0.

With particular preference the aromatic diol A1 is a diol of the formula (I) with $R^1$=$CH_2$ or $C(CH_3)_2H$, more particularly $C(CH_3)_2$.

Aromatic dials A1 which have shown themselves to be most preferable are those of the formula (I) where R'=C$(CH_3)_2$, n=n'=0, and having a total degree of alkoxylation of between 2 and 16.

It can be advantageous for the two-component polyurethane composition also to contain mixtures of different aromatic dials A1.

The aromatic diol A1 is used preferably in an amount of 2% to 10% by weight, based on the overall composition.

The aliphatic triol A2 is an aliphatic triol having a molecular weight of 360 to 6000 g/mol, corresponding to an OH equivalent weight of 120 to 2000, in particular a molecular weight of 120 to 2000 g/mol, preferably of 160 to 1700 g/mol.

There are different kinds of such aliphatic triols. Thus, for example, they may contain urethane and/or urea and/or ether groups. The morphology of the triols may be very different. Thus, for example, star-shaped or comb-shaped triols are possible. It is additionally possible for the trial to contain not only primary but also secondary hydroxyl groups. Preferably all three hydroxyl groups are primary hydroxyl groups.

Aliphatic trials A2 can be attained, for example, from an aliphatic triisocyanate, more particularly from an isocyanurate, which is formed from three isocyanate molecules, in an excess of aliphatic dials, more particularly of polyetherdiols, where appropriate by further subsequent extension by means of aliphatic diisocyanates and aliphatic diols.

Further exemplary aliphatic triols A2 may be obtained from low molecular weight aliphatic triols, such as trimethylolpropane or glycerol, for example, and an aliphatic diisocyanate, with subsequent reaction with an aliphatic diol.

Further exemplary aliphatic triols A2 are products of an alkoxylation reaction of low molecular weight aliphatic triols, such as trimethylolpropane or glycerol, for example. In particular these are ethoxylated, or propoxylated or butoxylated, aliphatic triols, more particularly those of trimethylolpropane or glycerol.

It may be advantageous for the two-component polyurethane composition also to contain mixtures of different aliphatic triols A2. In particular it has been found advantageous to use mixtures of an aliphatic triol A2 having a relatively low molecular weight, more particularly between 360 and 2700 g/mol, with an aliphatic triol A2 having a higher molecular weight, more particularly between 4200 and 6000 g/mol.

If only one aliphatic triol A2 is used, it is advantageous to choose one having a medium molecular weight, more particularly between 2000 and 4000 g/mol.

The weight ratio A1/A2 of aromatic diol A1 to aliphatic triol A2 is preferably between 0.05 and 0.3.

The polyol component K1 may further comprise other constituents. It is advantageous to use curing catalysts. Catalysts of this kind are known to the skilled worker for the reaction of polyisocyanates with polyols, and where appropriate also for reaction with polyamines or water. Examples that may be mentioned of such catalysts include organometallic catalysts of tin, zinc and bismuth, such as dibutyltin dilaurate, or tertiary amines, such as 1,4-diazobicyclo[2.2.2] octane (DABCO), for example.

As additional constituents it is also possible for there to be dials, more particularly polyoxyalkylenediols, and/or diamines. Suitable amines include, in particular, aliphatic, araliphatic, cycloaliphatic and toxicologically unobjectionable aromatic amines. Through the selection and concentration of suitable amines and also catalysts it is possible to exert an advantageous influence over the pot life, cure behavior and slip behavior.

The polyisocyanate component K2 comprises at least one polyisocyanate B1.

Particularly suitable as polyisocyanate B1 are, on the one hand, polyisocyanates B1' which in addition to two or more free isocyanate groups contain at least one urea or urethane or biuret or urethdione group. Particularly suitable are polyisocyanates based on aromatic polyisocyanates, more particularly on diphenylmethane diisocyanate (2,4'- and/or 4,4'-MDI). On the one hand, polyisocyanates of the type as available commercially in the form of Desmodur® VH 20 from Bayer have been found particularly suitable. Further suitable polyisocyanates B1 are isocyanurates or biurets of a diisocyanate, more particularly of HDI and/or IPDI and/or TDI.

It is entirely possible to use mixtures of polyisocyanates B1'. One preferred embodiment employs a polyisocyanate B1' mixture of the Desmodur® VH 20 type with an HDI isocyanurate.

Particularly suitable as polyisocyanate B1 on the other hand are polyurethane prepolymers B1" which contain at least two isocyanate groups and which are formed from a reaction of at least one polyisocyanate having a molecular weight of less than 300 g/mol, more particularly of between 150 g/mol and 270 g/mol, with at least one polyol AB1. Particularly suitable as polyol AB1 are polyols which are selected from the group encompassing polyetherpolyols, polyesterpolyols, polycarbonatepolyols, polyols formed from unsaturated monomers and mixtures thereof. The preparation of isocyanate-group-containing polyurethane prepolymers of this kind is accomplished in a known way and typically takes place in a stoichiometric excess of the polyisocyanate over the polyol. Polyisocyanates used for this purpose include, in particular, 2,4- and 2,6-tolylene diisocyanate (TDI), 2,4'- and 4,4'-diphenylmethane diisocyanate (MDI), 1,6-hexamethylene diisocyanate (HDI) and the isomer mixtures thereof, and mixtures with one another. MDI is particularly preferred.

Polyetherpolyols, also called polyoxyalkylenepolyols, are polymerization products of ethylene oxide, 1,2-propylene oxide, 1,2- or 2,3-butylene oxide, tetrahydrofuran or mixtures thereof; where appropriate they are polymerized with the aid of a starter molecule having two or more active hydrogen atoms, such as water, ammonia, or compounds having two or more OH or NH groups, for example, such as 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and mixtures of the aforementioned compounds. It is possible to use not only polyoxyalkylenepolyols which have a low degree of unsaturation (measured in accordance with ASTM D-2849-69 and reported in milliequivalents of unsaturation per gram of polyol (meq/g), prepared for example by means of double metal cyanide complex catalysts (DMC catalysts), but also polyoxyalkylenepolyols having a higher degree of unsaturation, prepared for example by means of anionic catalysts such as NaOH, KOH or alkali metal alkoxides.

Particularly suitable are polyoxyalkylenediols or polyoxyalkylenetriols, more particularly polyoxypropylenediols or polyoxypropylenetriols.

Acclaim types of specific suitability are polyoxyalkylenediols or polyoxyalkylenetriols having a degree of unsaturation of less than 0.02 meq/g and having a molecular weight in the range from 1000 to 30 000 g/mol, and also polyoxypropylenediols and -triols having a molecular weight of 400 to 8000 g/mol. By "molecular weight" or "molar weight" is meant, in the present document, always the molecular weight average $M_n$.

Likewise particularly suitable are what are called "EO-endcapped" (ethylene oxide-endcapped) polyoxypropylenediols or -triols. The latter are special polyoxy-propylene-polyoxyethylenepolyols, obtained for example by alkoxylating pure polyoxypropylenepolyols with ethylene oxide after the end of the polypropoxylation, and which as a result have primary hydroxyl groups.

Polyesterpolyols are, in particular, polyols which are formed for example from dihydric and/or trihydric alcohols such as, for example, 1,2-ethanediol, diethylene glycol, 1,2-propanediol, dipropylene glycol, 1,4-butanediol, 1,5-pentanediol, 1,6-hexanediol, neopentylglycol, glycerol, 1,1,1-trimethylolpropane or mixtures of the aforementioned alcohols with organic dicarboxylic acids or their anhydrides or esters, such as, for example, succinic acid, glutaric acid, adipic acid, suberic acid, sebacic acid, dodecanedicarboxylic acid, maleic acid, fumaric acid, phthalic acid, isophthalic acid, terephthalic acid and hexahydrophthalic acid or mixtures of the aforementioned acids, and also polyesterpolyols formed from lactones, such as 6-caprolactone, for example.

Particularly preferred polycarbonatepolyols are those obtainable by reacting the abovementioned alcohols—those used to synthesize the polyesterpolyols—with dialkyl carbonates, diaryl carbonates or phosgene.

By "polyols formed from unsaturated monomers" are meant, in particular, polyols of the kind formed from the polymerization of at least one of the monomers selected from the group encompassing ethylene, propylene, butylene, butadiene, isoprene, styrene, vinyl alcohol, vinyl ethers, vinyl esters, acrylonitrile, acids, amides and esters of acrylic acid, methacrylic acid, maleic acid, fumaric acid, crotonic acid and itaconic acid and also mixtures thereof.

Particularly suitable polyols formed from unsaturated monomers are hydroxy-functional polybutadienes such as polybutadienepolyols and hydrogenated polybutadienepolyols, and also poly(meth)acrylatepolyols. By "(meth)acrylate" is meant, here and in the remainder of the present document, esters of both acrylic acid and of methacrylic acid. Similarly, "(meth)acrylic acid" identifies not only acrylic acid but also methacrylic acid.

"Poly(meth)acrylatepolyols" here are polymers which are copolymers of a hydroxy-functional (meth)acrylic ester and at least one further monomer selected from the group encompassing the monomers acrylic acid, methacrylic acid, $C_1$-$C_{18}$ alkyl esters of acrylic acid or methacrylic acid, styrene, vinyl esters and vinyl alcohol. Preferred hydroxy-functional (meth)acrylic esters are hydroxyethyl (meth)acrylate, hydroxypropyl (meth)acrylate and hydroxybutyl (meth)acrylate.

These stated polyols AB1 preferably have an average molecular weight of 250 to 30 000 g/mol, more particularly of 1000 to 8000 g/mol, and are preferably diols or triols, more particularly having an average OH functionality in the range from 1.6 to 3.

One preferred embodiment uses a mixture of polyols AB1 which is a mixture of diols and trials.

In one embodiment of the invention the polyisocyanate component K2 comprises at least one polyisocyanate B1' and at least one polyisocyanate polyurethane prepolymer B1".

Both components K1 and K2, may contain additional constituents in addition to those already mentioned, of the kind the skilled worker knows from two-component polyurethane chemistry. These constituents may be present in only one component or in both. Examples of additional constituents of this kind that are used include solvents, plasticizers and/or extenders, fillers, such as carbon blacks, chalks or talcs, adhesion promoters, more particularly trialkoxysilanes, and thixotropic agents, such as amorphous silicas, and zeolites.

As the skilled polyurethane adhesives worker knows, it is necessary to ensure, when preparing the components, particularly in the case of the polyisocyanate component K2, that the raw materials are very largely free from water and that, during and following their preparation, it is virtually impossible for any moisture to come into contact with the component. This is achieved on the one hand by physical or chemical drying of the starting substances, and also by operating under inert gas, typically nitrogen.

The components K1 and K2 are advantageously formulated such that the volume ratio of component K1 to component K2 is between 1:3 and 3:1, more particularly between 1:2 and 2:1. With particular preference this ratio is approximately 1:1. The mixing ratio is preferably such that the NCO groups of component K2 are stoichiometric in relation to the NCO-reactive groups, typically OH groups, of component K1. If mixing is carried out not with substantial stoichiometry, i.e., with deviations of more than 5%, the reaction of components K1 and K2 is non-optimal, leading to a reduction in the mechanical properties of the cured polyurethane composition. This is true in particular for an excess of the polyol component. In the case of an excess of polyisocyanate, the situation is likewise fundamentally disadvantageous, but the impaired mechanical properties can be at least partly remedied by the subsequent reaction of the unreacted isocyanate groups with moisture, originating for example from the atmospheric moisture, which may if appropriate lead to further crosslinks.

Prior to application, the components K1 and K2 are stored separately from one another and are mixed with one another only during or immediately prior to application. The components are advantageously present in a pack which is composed of two separate chambers, with the polyol component K1 present in one chamber and the polyisocyanate component K2 present in the other chamber. The components K1 and K2 are introduced into the chambers of the pack and given an airtight and moisture-tight seal.

Preferred packages of this kind are, on the one hand, side-by-side double cartridges or coaxial cartridges, in which two tubular chambers are arranged alongside one another or inside one another and are sealed with pistons in an airtight and moisture-tight way. The driving of these pistons allows the components to be extruded from the cartridge. The ends of the tubes opposite the pistons are modified in such a way, via an adapter where appropriate, that the chamber openings in the region of the opening are connected directly to one another via a dividing wall. Advantageously there is a thread made in the region of the exit opening of the chambers, so that a static mixer or dynamic mixer can be mounted closely. Packages of this kind are preferred in particular for small-scale applications, in particular for volumes of up to 1 liter.

For larger applications, particularly for applications in industrial manufacture, the components K1 and K2 are advantageously dispensed and stored in drums or pails. In this case the components are extruded via hydraulic presses, in particular by way of follower plates, and are supplied via pipelines to a mixing apparatus of the kind typically used for two-component adhesives in industrial manufacture.

With any package it is important that the polyisocyanate component K2 at least be given an airtight and moisture-tight seal, so that both components can be stored for a long time, i.e., typically longer than 6 months.

The method of adhesive bonding comprises the following steps:
  mixing the above-described components K1 and K2,
  applying the mixed polyurethane composition to at least one substrate surface to be bonded,
  carrying out joining within the open time,
  curing the polyurethane composition.

Mixing is accomplished typically via static mixers or with the aid of dynamic mixers. At the mixing stage it is important to ensure that the two components are mixed as homogeneously as possible. If the two components are poorly mixed, there are local deviations from the optimum mixing ratio—i.e., substantially stoichiometric—and this has the consequence of an impairment in the mechanical properties of the cured polyurethane composition. In order to assess the quality of mixing from a visual standpoint as well it is advantageous if the two components K1 and K2 have two different colors, which can be distinguished well visually from one another and also from the mixture. An example of a color combination of this kind is present when one component is black and the other is white. In that case, effective mixing is present when there is a homogeneous gray color and there are no streaks or patterns in light or dark gray or in white or black.

The mixed polyurethane composition is applied to at least one substrate surface to be bonded. The substrate to be bonded is preferably a metal, plastic, glass or ceramic. Typically there are two substrates present and intended for bonding. It is possible for the partner adherend, i.e., the second substrate, to be identical to or different from the first substrate. Adhesive may be applied to the first and/or second adherend. Following application of adhesive, the adherends are joined within the open time. Subsequent to joining, the polyurethane composition is cured.

This produces an assembly of the adherends, the adhesive positively connecting these adherends to one another.

The polyurethane composition is preferably employed as a structural adhesive. Typical examples of applications for such adhesives are found in built structures, automobiles, vehicles or boats. In these cases the cured adhesive is part of a load-bearing structure and therefore constitutes an important connecting element, whose mechanical properties are subject to exacting requirements. The present invention meets these exacting requirements very well indeed.

Moreover, as a result of the high extension, the adhesive composition of the invention exhibits high impact toughness and also an outstanding aging stability, particularly with respect to moisture and temperature fluctuation. Additionally it has been found that the composition of the invention, particularly as a result of the use of an alkoxylated aromatic diol, has an improved adhesion to metallic surfaces.

EXAMPLES

Preparation

The compositions Ex1 and Ex2 and also Ref.1 as reference example, set out by way of example in table 1, all have the same component K2.

For the production of components K1, ExA1 and ExA2, and also of the reference component RefA.1, the polyol mixture was charged to a vacuum dissolver and, following the addition of catalyst and drying agent, and in the absence of moisture, the mixture was stirred at 25° C. for 20 minutes. These polyol components K1 were subsequently dispensed into one chamber of a side-by-side double cartridge (vol/vol=1:1) made of polypropylene, and were given an airtight and moisture-tight seal with plastic pistons.

For component K2, dried chalk was added to the polyisocyanate and incorporated homogeneously in a vacuum dissolver, with stirring and under reduced pressure, at 25° C. for 20 minutes. Subsequently this polyisocyanate component K2 was dispensed into the second chamber of the abovementioned side-by-side double cartridge, and was likewise provided with an airtight and moisture-tight seal using a plastic piston.

Components K1 and K2 were mixed 1:1 volumetrically by means of a static mixer, in the quantities indicated in table 1.

Measurements

The mixed components K1 and K2 were introduced into dumbbell molds in accordance with ISO 527, Part 2, 1B and were cured at 25° C. for 24 h and then at 105° C. for 3 h. Following a conditioning time of 24 h at 25° C., elasticity modulus, tensile strength and elongation of the specimens thus produced were measured in accordance with ISO 527 on a Zwick Z020 tensile testing machine, with a test temperature of 20° C. and a test speed of 50 mm/min.

TABLE 1

Compositions and results of measurement

| | | Examples | | |
|---|---|---|---|---|
| | | Ref. 1 | Ex1 | Ex2 |
| Component K1 | | RefA.1 (wt. %) | ExA1 (wt. %) | ExA2 (wt. %) |
| Polyethertriol OH equivalent weight 146 g Hydroxyl number 385 mg KOH/g | A2 | 47.5 | 40.0 | 30 |
| Polypropylene ether triol | A2 | 47.5 | 45.0 | 45.0 |

TABLE 1-continued

Compositions and results of measurement

| | | Examples | | |
|---|---|---|---|---|
| | | Ref. 1 | Ex1 | Ex2 |
| OH equivalent weight 1600 g Hydroxyl number 35 mg KOH/g | | | | |
| Propoxylated bisphenol A (TAG = 3) | A1 | 0 | 10 | 20 |
| DABCO | | 0.2 | 0.2 | 0.2 |
| Zeolite (drying agent) | | 4.8 | 4.8 | 4.8 |
| A1/A2 | | 0 | 0.118 | 0.267 |
| Component K2 | | (wt. %) | (wt. %) | (wt. %) |
| Desmodur ® VH 20 | B1 | 48.0 | 48.0 | 48.0 |
| Chalk | | 52.0 | 52.0 | 52.0 |
| K2/K1 (w/w) | | 1.274 | 1.2643 | 1.1988 |
| Elasticity modulus [MPa] | | 1200 | 1415 | 1585 |
| Tensile strength [MPa] | | 21 | 23 | 25 |
| Breaking elongation [%] | | 45 | 53 | 47 |

From the results it is evident that examples Ex1 and Ex2 have not only a higher tensile strength but also higher breaking elongation as compared with Ref.1.

The invention claimed is:

1. A two-component polyurethane composition comprising:
   a polyol component K1; and
   a polyisocyanate component K2,
   the polyol component K1 comprising a mixture of at least one alkoxylated aromatic diol A1 and at least one aliphatic triol A2, and
   the polyisocyanate component K2 comprising at least one polyisocyanate B1,
   wherein:
      a weight ratio A1/A2 is between 0.05 and 0.3; and
      a volume ratio of components K1 and K2 is between 1:3 and 3:1.

2. The two-component polyurethane composition of claim 1, wherein the polyisocyanate B1 is a polyisocyanate B1' that comprises:
   two or more free isocyanate groups; and
   at least one urea or urethane or biuret or urethdione group.

3. The two-component polyurethane composition of claim 2, wherein the polyisocyanate B1' is an isocyanurate or biuret of a diisocyanate.

4. The two-component polyurethane composition of claim 1, wherein the polyisocyanate B1 is a polyurethane prepolymer B1'' that comprises at least two isocyanate groups and is prepared from a reaction of at least one polyisocyanate having a molecular weight of less than 300 g/mol with at least one polyol AB1.

5. The two-component polyurethane composition of claim 4, wherein the polyisocyanate having a molecular weight of less than 300 g/mol is MDI, HDI or TDI.

6. The two-component polyurethane composition of claim 1, wherein the composition comprises at least one polyisocyanate wherein the polyisocyanate B1 comprises two or more free isocyanate groups and at least one urea or urethane or biuret or urethdione group and at least one polyurethane prepolymer comprising at least two isocyanate groups and is prepared from a reaction of at least one polyisocyanate having a molecular weight of less than 300 g/mol with at least one polyol AB1.

7. The two-component polyurethane composition of claim 1, wherein the alkoxylated aromatic diol A1 is at least one diol selected from the group consisting of an ethoxylated aromatic diol and a propoxylated aromatic diol.

8. The two-component polyurethane composition of claim 7, wherein the diol has the formula (I):

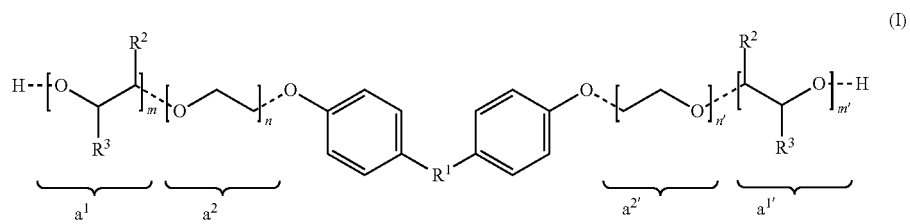

(I)

where:
   $R^1$=$CH_2$, $CH(CH_3)$ or $C(CH_3)_2$;
   $R^2$=H and $R^3$=methyl, or $R^2$=methyl and $R^3$=H;
   n+n'+m+m'=1 to 20; and
   the dashed lines indicate that a sequence of mutually attached alkylene glycol segments $a^1$, $a^{1'}$, $a^2$ and $a^{2'}$ is variable.

9. The two-component polyurethane composition of claim 8, wherein n=n'=0.

10. The two-component polyurethane composition of claim 1, wherein the aliphatic triol A2 possesses a molecular weight of 360 to 6000 g/mol.

11. The two-component polyurethane composition of claim 1, wherein the aromatic diol A1 is present in an amount of 2% to 10% by weight, based on the overall composition.

12. A package consisting of a pack with two separate chambers and a two-component polyurethane composition comprising:
   a polyol component K1; and
   a polyisocyanate component K2,
   the polyol component K1 comprising a mixture of at least one alkoxylated aromatic diol A1 and at least one aliphatic triol A2, and
   the polyisocyanate component K2 comprising at least one polyisocyanate B1,
   wherein:
      a weight ratio A1/A2 is between 0.05 and 0.3; and
      the polyol component K1 is present in one chamber and the polyisocyanate component K2 is present in the other chamber.

13. A method of adhesive bonding comprising the steps of:

mixing a polyol component K1 and a polyisocyanate component K2 of a two-component polyurethane composition;

applying the mixed polyurethane composition to at least one substrate surface to be bonded;

carrying out joining within the open time; and curing the polyurethane composition, wherein:

the polyol component K1 comprises a mixture of at least one alkoxylated aromatic diol A1 and at least one aliphatic triol A2;

the polyisocyanate component K2 comprises at least one polyisocyanate B1; and a weight ratio A1/A2 is between 0.05 and 0.3.

14. The method of claim 13, wherein the at least one substrate surface to be bonded is a metal, plastic, glass or ceramic.

15. A bonded article bonded by a method of claim 13.

16. The two-component polyurethane composition of claim 1, wherein the volume ratio of components K1 and K2 is between 1:2 and 2:1.

* * * * *